(12) United States Patent
Richards

(10) Patent No.: US 8,964,182 B2
(45) Date of Patent: Feb. 24, 2015

(54) ADAPTIVE MULTISPECTRAL IMAGING

(75) Inventor: Chet L. Richards, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 330 days.

(21) Appl. No.: 13/446,049

(22) Filed: Apr. 13, 2012

(65) Prior Publication Data

US 2013/0271766 A1    Oct. 17, 2013

(51) Int. Cl.
*G01N 21/25*    (2006.01)

(52) U.S. Cl.
USPC .......................................................... 356/416

(58) Field of Classification Search
USPC ................................................ 356/402–425
See application file for complete search history.

(56) References Cited

U.S. PATENT DOCUMENTS

| | | | |
|---|---|---|---|
| 5,014,131 A | 5/1991 | Reed et al. | |
| 5,166,755 A | 11/1992 | Gat | |
| 5,323,007 A * | 6/1994 | Wernick et al. | .......... 250/363.03 |
| 5,760,899 A | 6/1998 | Eismann | |
| 6,678,048 B1 | 1/2004 | Rienstra et al. | |
| 7,342,658 B2 | 3/2008 | Kowarz et al. | |
| 2002/0167615 A1* | 11/2002 | Spitzer et al. | ................. 348/679 |
| 2003/0193589 A1 | 10/2003 | Lareau et al. | |
| 2013/0083315 A1* | 4/2013 | Lo et al. | ......................... 356/73 |

FOREIGN PATENT DOCUMENTS

WO    0103646 A2    1/2001

\* cited by examiner

*Primary Examiner* — Abdullahi Nur
(74) *Attorney, Agent, or Firm* — Burns & Levinson LLP; Joseph M. Maraia

(57) ABSTRACT

A method for multispectral imaging that includes positioning a continuously graded color filter in front of a plurality of detectors. Wavelengths of energy passed by the filter vary smoothly along the filter length and the detectors are configured in a pattern having a plurality of rows each having a plurality of detectors. Each of the plurality of rows is oriented across the length of the filter. The method also includes measuring outputs of the detectors in response to moving an image along the length of the filter and generating a spectrum response function for the image based on the outputs of two or more rows of the detectors using a time delayed integration method.

20 Claims, 6 Drawing Sheets

ADAPTIVE MULTISPECTRAL IMAGING

FIELD OF THE INVENTION

The currently described invention relates to methods and apparatus for multispectral imaging.

BACKGROUND

Multispectral images include image data at specific frequencies across the electromagnetic spectrum. The image data wavelengths are often separated by filters that are sensitive to particular wavelengths. Multispectral imaging provides information the human eye fails to capture. Conventional multispectral sensors typically consist of a set of fixed narrow bandwidth filters. The arrangement is compact, but is limited in performance because the sensors are configured for a particular use. A need therefore exists for improved methods and systems for multispectral imaging.

SUMMARY

The embodiments described herein are multispectral imaging apparatus and methods in which the spectral bandwidth can be varied in a controllable manner. One embodiment is a method for multispectral imaging that includes positioning a continuously graded color filter in front of a plurality of detectors. Wavelengths of energy passed by the filter vary smoothly along the filter length and the detectors are configured in a pattern having a plurality of rows each having a plurality of detectors. Each of the plurality of rows is oriented across the length of the filter. The method also includes measuring outputs of the detectors in response to moving an image along the length of the filter and generating a spectrum response function for the image based on the outputs of two or more rows of the detectors using a time delayed integration method.

In some embodiments, the step of generating a spectrum response function includes summing the outputs of two or more rows of the detectors. In some embodiments, the step of generating a spectrum response function includes subtracting the outputs of two or more rows of the detectors. In some embodiments, the method includes selecting specific rows to sum or subtract to control wavelength filtering properties. In some embodiments, the rows selected for generating the spectrum response function are not adjacent rows.

In some embodiments, the step of generating a spectrum response function includes subtracting the outputs of two or more rows of the detectors to produce a spectrum response function that has two peaks in the spectrum. In some embodiments, the method includes moving the image relative to the detectors at a constant velocity along the length of the filter. In some embodiments, the method includes generating multiple spectrum response functions based on the outputs of different combinations of rows. In some embodiments, the method includes converting the detector outputs to digital data prior to generating the spectrum response function. In some embodiments, the method includes convolving the spectrum response function with a target spectrum to produce a target signature for a target in the image.

Another embodiment is a multispectral imaging apparatus that includes a continuously graded color filter configured so wavelengths of energy passed by the filter vary smoothly along the filter length. The apparatus also includes a plurality of detectors located on a first side of the filter and configured in a pattern having a plurality of rows each having a plurality of detectors to output signals generated in response to an image moving across the length of the filter. Each of the plurality of rows is oriented across the length of the filter. The detectors measure energy passing through the filter. The apparatus also includes a spectrum response module coupled to the plurality of detectors and configured to generate a spectrum response function for the image based on digital data associated with the outputs of two or more rows of the detectors using a time delayed integration method.

In some embodiments, the spectrum response module is configured to generate the spectrum response function by summing the outputs of two or more rows of the detectors. In some embodiments, the spectrum response module is configured to generate the spectrum response function by subtracting the outputs of two or more rows of the detectors. In some embodiments, the spectrum response module is configured to sum or subtract specific rows to control wavelength filtering properties of the apparatus.

In some embodiments, the rows selected for summing or subtracting are not adjacent rows. In some embodiments, the spectrum response module is configured to subtract the outputs of two or more rows of the detectors to generate a spectrum response function that has two peaks in the spectrum. In some embodiments, the apparatus includes an actuator stage coupled to the filter and detectors to move the image relative to the detectors.

In some embodiments, the spectrum response function is configured to generate multiple spectrum response functions based on the outputs of different combinations of rows. In some embodiments, the apparatus includes an analog-to-digital converter module configured to convert the detector outputs to digital data and to provide the digital data to the spectrum response function module to generate the spectrum response function. In some embodiments, the apparatus includes a convolution module configured to convolve the spectrum response function with a target spectrum to produce a target signature for a target in the image.

The multispectral imaging apparatus and methods described herein (hereinafter "technology") can provide one or more of the following advantages. The response of a multispectral sensor can be changed in real-time because detector outputs can be processed (e.g., summed or subtracted) to tailor the spectral bandwidth properties of the sensor. The bandwidth of a sensor can be varied during operation because the spectral filters are graded and have a relatively wide bandwidth. Signal-to-noise properties of a multispectral sensor are improved because the technology uses a time delayed integration method to combine outputs of the detectors. Multiple spectrum response functions can be generated because the technology processes detector outputs to generate different response functions rather than changing the filters to generate different response functions.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Figure 1A:
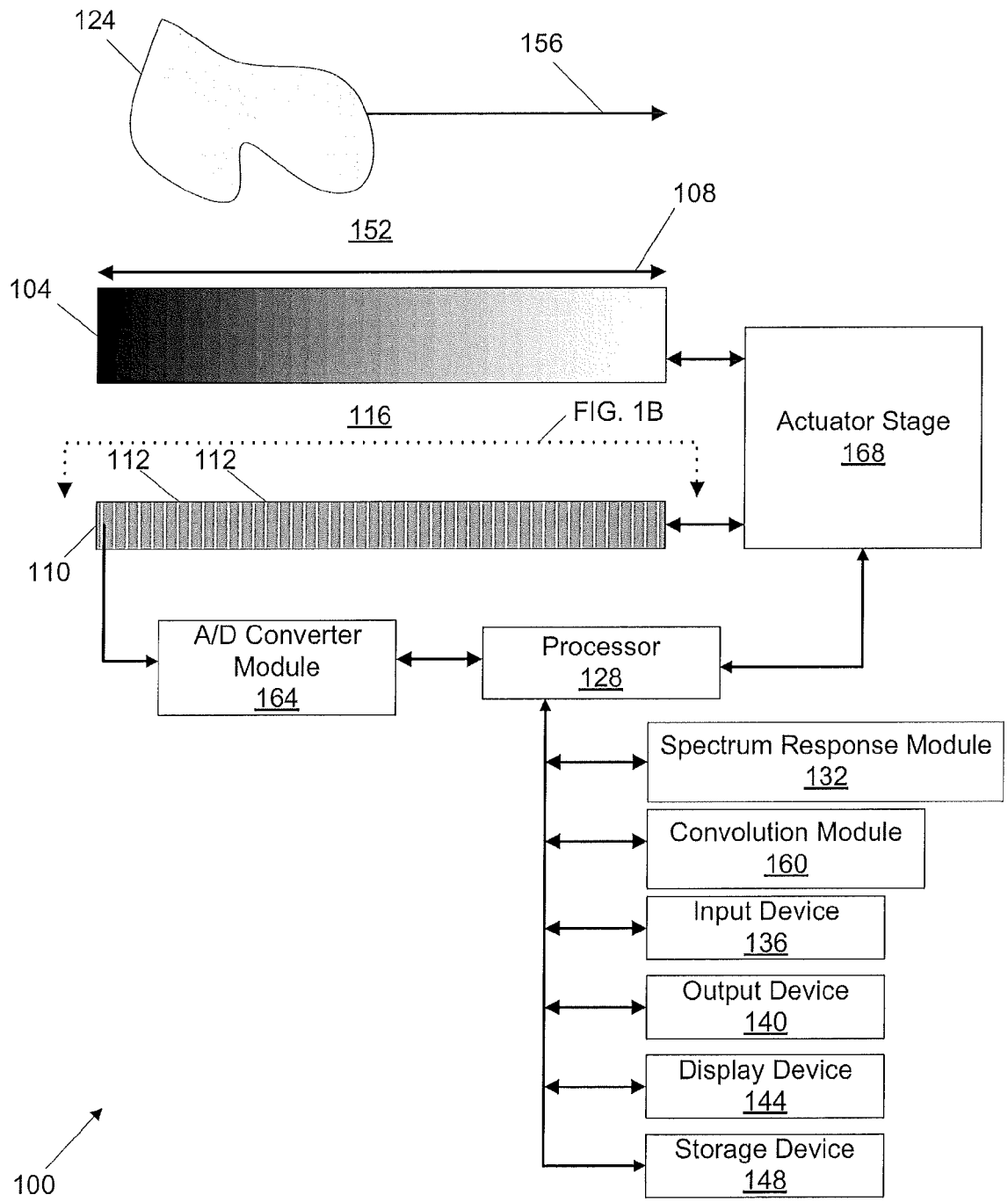
FIG. 1A is a schematic illustration of a multispectral imaging apparatus, according to an illustrative embodiment.
Figure 1B:
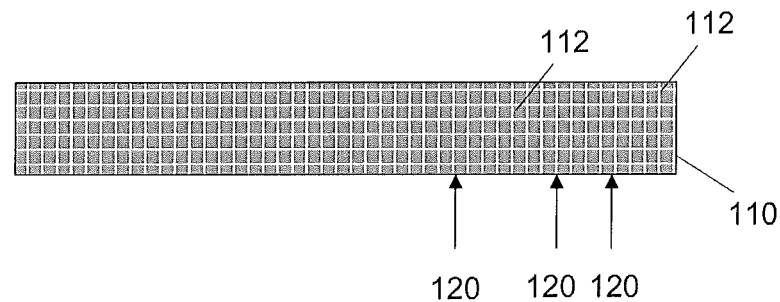
FIG. 1B is a top view of the plurality of detectors of the apparatus of FIG. 1A.
Figure 1C:
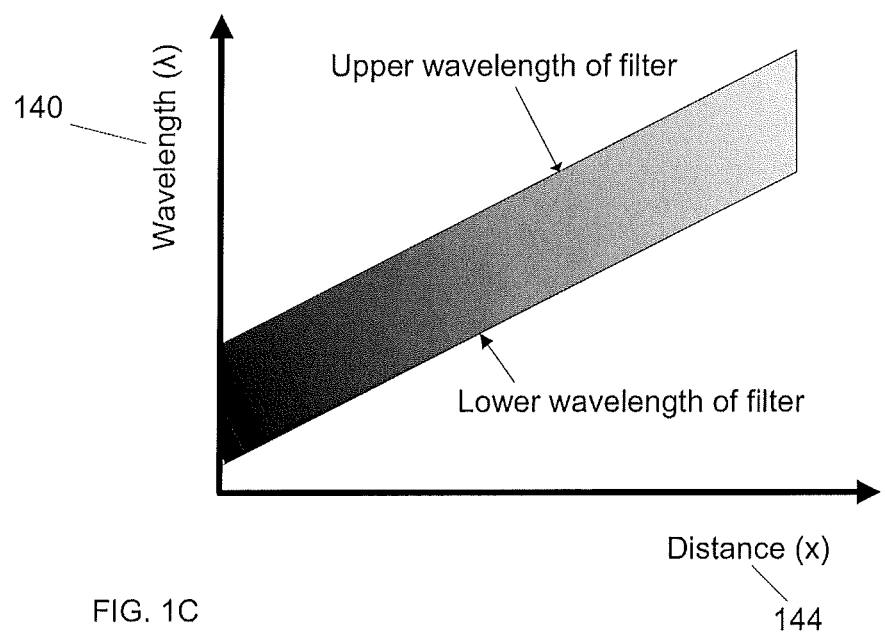
FIG. 1C is a schematic illustration of a plot of filter wavelength bandwidth versus the location along the length of the filter, according to an illustrative embodiment.

FIG. 1A is a schematic illustration of a multispectral imaging apparatus 100, according to an illustrative embodiment. The apparatus 100 includes a continuously graded color filter 104. FIG. 1C is a schematic illustration of a plot of the wavelength bandwidth of the filter 104 as a function of the location along the length of the filter 104, according to an illustrative embodiment. The horizontal axis 144 is the distance along the length of the filter and the vertical axis 140 is the wavelength response of the filter. The filter 104 is configured such that wavelengths of energy passed by the filter 104 vary smoothly along the filter length 108. The apparatus 100 also includes detector array 110 that includes a plurality of detectors 112. The detector array 110 is located on a first side 116 of the filter 104. The detectors 112 measure the energy passing through the filter 104. Referring to FIG. 1B, the detectors 112 are configured in a pattern having a plurality of rows 120. Each row 120 has a plurality of detectors 112 that output signals generated in response to an image 124 moving (shown by arrow 156) across the length 108 of the filter 104. The image 124 is located on the second side 152 of the filter 104 and is moved across the length 108 of the filter 104 at, for example, a constant velocity. The apparatus includes an actuator stage 168 coupled to the filter 104 and detectors 112 to move the image 124 relative to the detectors 112. The processor 128 is coupled to the actuator stage 168. The processor receives position signals from the actuator stage 168 and provides position commands to the actuator stage 168 to command the actuator stage 168 to move the image 124 relative to the detectors 112.

The apparatus 100 also includes a processor 128 coupled to the detectors 112 of the detector array 110. The apparatus 100 includes an analog-to-digital converter module 164 that couples the detectors 112 to the processor 128. The analog-to-digital converter module 164 converts the detector 112 outputs to digital data and provides the digital data to a spectrum response module 132 to generate a spectrum response function. The spectrum response module 132 is configured to generate a spectrum response function for the image 124 based on digital data associated with the outputs of two or more rows 120 of the detectors 112 using a time delayed integration method. The spectrum response function can be generated in accordance with, for example, the method of FIG. 2. In some embodiments, the spectrum response function module 132 is configured to generate multiple spectrum response functions based on the outputs of different combinations of rows of the detectors. The processor 128 is also coupled to the actuator stage 168 and provides commands to the actuator stage 168 to move the image 124 relative to the detectors 112.

The processor 128 is also coupled to a convolution module 160, an input device 136, an output device 140, a display device 144, and memory 148. The convolution module 160 is configured to convolve the spectrum response function with a target spectrum of a give target object to produce a target signature for a target in the image 124. Pattern recognition techniques may then be used by, for example, the processor 128 to discriminate one target from another target. The pattern recognition techniques are applied to the convolved spectrum response functions.

The modules and devices described herein can, for example, utilize the processor 128 to execute computer executable instructions and/or include a processor to execute computer executable instructions (e.g., an encryption processing unit, a field programmable gate array processing unit, etc.). The system 100 can include, for example, other modules, devices, and/or processors known in the art and/or varieties of the illustrated modules, devices, and/or processors. The input device 136 receives information associated with the system 100 (e.g., instructions from a user, instructions from another computing device) from a user (not shown) and/or another computing system (not shown). The input device 136 can include, for example, a keyboard or a scanner. The output device 140 outputs information associated with the system 100 (e.g., information to a printer (not shown), information to a communication device (not shown)).

The display device 144 displays information associated with the system 100 (e.g., status information, configuration information). The processor 128 executes the operating system and/or any other computer executable instructions for the system 100 (e.g., sends signals to a target tracking system regarding the target with the image 124). The storage device 148 stores the various information associated with the system 100 and its operation. The storage device 148 can store information and/or any other data associated with the system 100. The storage device 148 can include a plurality of storage devices. The storage device 148 can include, for example, long-term storage (e.g., a hard drive, a tape storage device, flash memory, etc.), short-term storage (e.g., a random access memory, a graphics memory, etc.), and/or any other type of computer readable storage.

Figure 2:
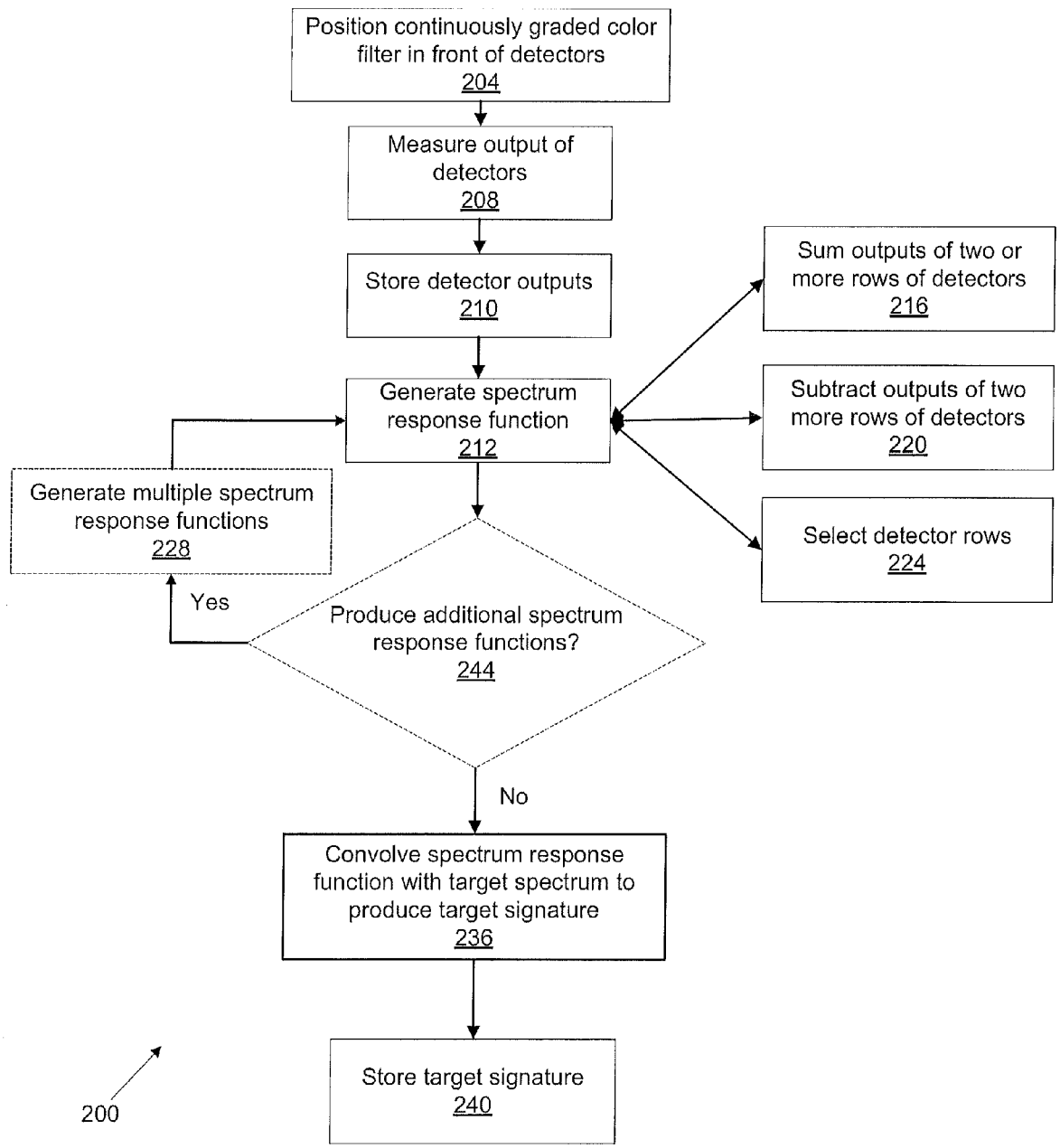
FIG. 2 is a flowchart of a method for multispectral imaging, according to an illustrative embodiment.

FIG. 2 is a flowchart 200 of a method for multispectral imaging, according to an illustrative embodiment. The method includes positioning 204 a continuously graded color filter in front of a plurality of detectors (e.g., filter 104 and detectors 112 of FIG. 1A). The wavelengths of energy passed by the filter vary smoothly along the filter length. The detectors are configured in a pattern having a plurality of rows. Each row includes a plurality of detectors. Each of the plurality of rows is oriented across the length of the filter.

The method also includes measuring 208 outputs of the detectors in response to moving an image (e.g., image 124 of FIG. 1A) along the length of the filter. The outputs of the detectors are then stored 210 in, for example, the storage device 148 of FIG. 1A. The outputs are stored so they can be processed in an offline manner. The outputs can be processed in a parallel processing manner to, for example, generate multiple spectrum response functions. In some embodiments, the outputs are processing in a real time manner as they are acquired. The method also includes generating 212 a spectrum response function for the image based on the outputs of two or more rows of the detectors using a time delayed integration method. In some embodiments, the detector outputs are analog signals and are converted to digital data using an analog-to-digital converter module prior to generating the spectrum response function. In some embodiments, generating the spectrum response function includes summing 216 the outputs of two or more rows of the detectors. In some embodiments, the step of generating a spectrum response function includes subtracting 220 the outputs of two or more rows of the detectors.

The method can first include selecting 224 which rows of detectors to use to generate the spectrum response function. Specific rows can be selected to control the wavelength filtering properties of the system. In some embodiments, the outputs of several adjacent rows of detectors are added together to increase the sensitivity of the apparatus in a particular band of wavelengths. This is one reason why it is desirable for the bandwidth of the filter to be relatively wide at points along the length of the filter. In some embodiments, the filtering properties are controlled by selecting rows that have an average wavelength that is characteristic of specific features in known sets of targets. In some embodiments, the rows are selected to synthesize the desired wavelength bandwidths for the system. In addition, combining together the outputs of a larger number of adjacent rows results in a wider wavelength bandwidth for the measurement.

After the spectrum response function is generated, the method includes convolving 236 the spectrum response function with a target spectrum to produce a target signature for a target in the image. The target signature can be stored 240 in a storage module (e.g., storage module 148 of FIG. 1A). Because the detector outputs have been previously stored, the detector output data can be independently added, or subtracted, in various combinations. Various types of spectral analysis methods can be carried out in parallel without mutual interference. This is not typically possible in conventional multispectral systems In some embodiments, the method also optionally includes generating 228 multiple spectrum response functions based on, for example, the outputs of different combinations of rows. The method includes determining 244 if additional spectrum response functions are to be generated. If multiple spectrum response functions are to be generated, the method proceeds from step 244 to step 228. If multiple spectrum response functions are not to be generated step 244 proceeds to step 236.

Figure 3A:
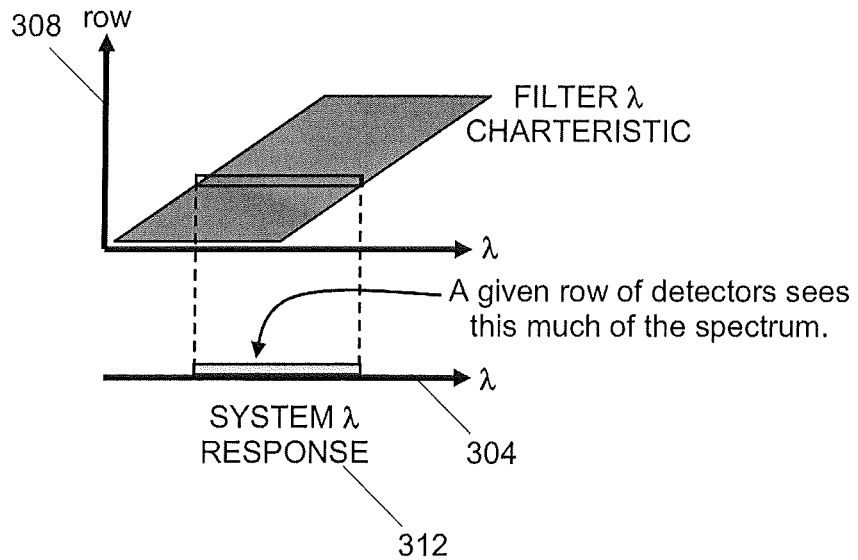
FIG. 3A is a schematic illustration of a plot of an exemplary spectrum response function of a single row of detectors, at a single point in time.

FIG. 3A is a schematic illustration of a plot of an exemplary spectrum response function 312 of a single row of detectors, at a single point in time. The horizontal axis 304 is the wavelength response of the filter and the vertical axis 308 is the detector row of the filter. The spectrum wavelength bandwidth is the width of the filter at the selected row.

Figure 3B:
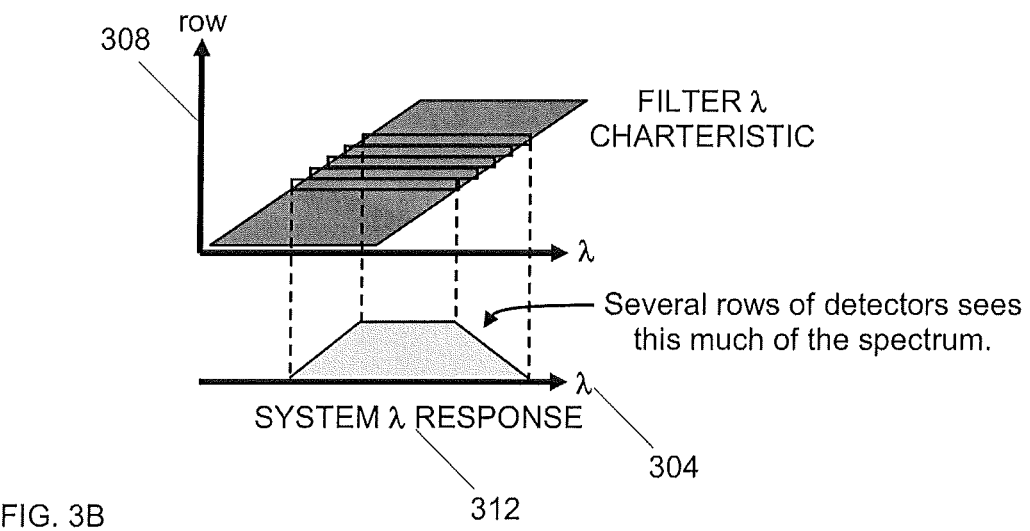
FIG. 3B is a schematic illustration of a plot of an exemplary spectrum response function in which the output of several successive rows of detectors are added together using a time delayed integration (TDI) method.

FIG. 3B is a schematic illustration of a plot of an exemplary spectrum response function 312 in which the output of several successive rows of detectors are added together using a time delayed integration (TDI) method. The horizontal axis 304 is the wavelength response of the filter and the vertical axis 308 is the detector row of the filter. Because the outputs from several rows of detectors are being TDI added, the peak system response is proportional to the number of rows that are added. Noise in the measurement increases as the square root of the number of rows, so the signal-to-noise ratio (SNR) will also increase like the number of rows that are synchronously (i.e., TDI) added. The wavelength bandwidth is also increased. This illustrates the tradeoff between wavelength bandwidth and SNR. It is possible to add many more rows and achieve greater SNR, but simultaneously the wavelength bandwidth will also be much greater. In spectroscopy one typically desires a narrow bandwidth so details of the spectrum can be resolved. Thus, this trade is really a reciprocal one.

Figure 3C:
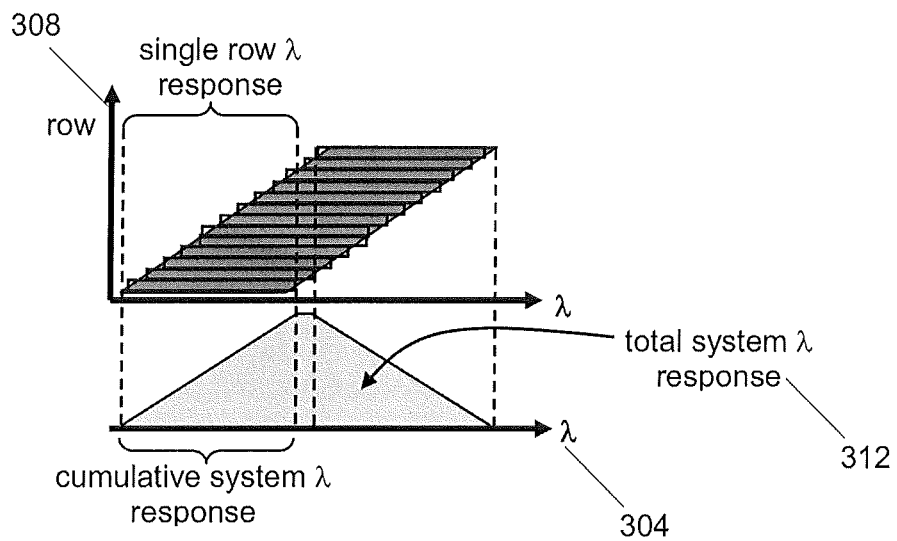
FIG. 3C is a schematic illustration of a plot of an exemplary spectrum response function in which the output of all the detector rows are added together using a time delayed integration (TDI) method.

FIG. 3C is a schematic illustration of a plot of an exemplary spectrum response function 312 in which the output of all the detector rows are added together using a time delayed integration (TDI) method. The horizontal axis 304 is the wavelength response of the filter and the vertical axis 308 is the detector row of the filter. TDI adding all the detectors under the graded wavelength filter provides a substantially improved SNR. However, the portion of the spectrum spanned by each row of detectors is substantially less than the total filtered spectrum, which causes the spectral response to peaked at an intermediate wavelength. The signal response tapers to a minimum at each end of the spectrum covered by the graded filter.

Figure 3D:
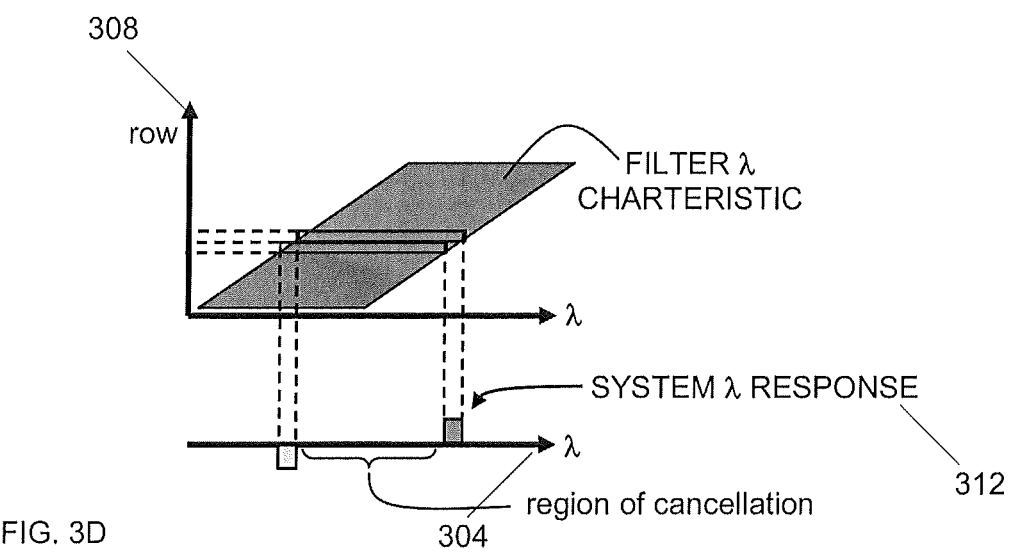
FIG. 3D is a schematic illustration of a plot of an exemplary spectrum response function in which the output of one detector row is subtracted from its succeeding row.

FIG. 3D is a schematic illustration of a plot of an exemplary spectrum response function 312 in which the output of one detector row is subtracted from its succeeding row. The horizontal axis 304 is the wavelength response of the filter and the vertical axis 308 is the detector row of the filter. The spectrum response 312 over most of the filter bandwidth is cancelled by the subtraction. The contributions from the edges of the filter bandwidth remain where the filter response is different for the two successive rows of detectors. The system wavelength response will therefore have contributions from two portions of the spectrum which are separated by the local bandwidth of the filter. One of these contributions to the delivered signal will be positive and the other negative. The wider the filter bandwidth, the greater will be the wavelength separation between the edge contributions. This illustrates the merit of having a relatively wide filter wavelength bandwidth. However, in this case the noise from each row of detectors adds incoherently so that the resulting signal-to-noise ratio is reduced.

Figure 3E:
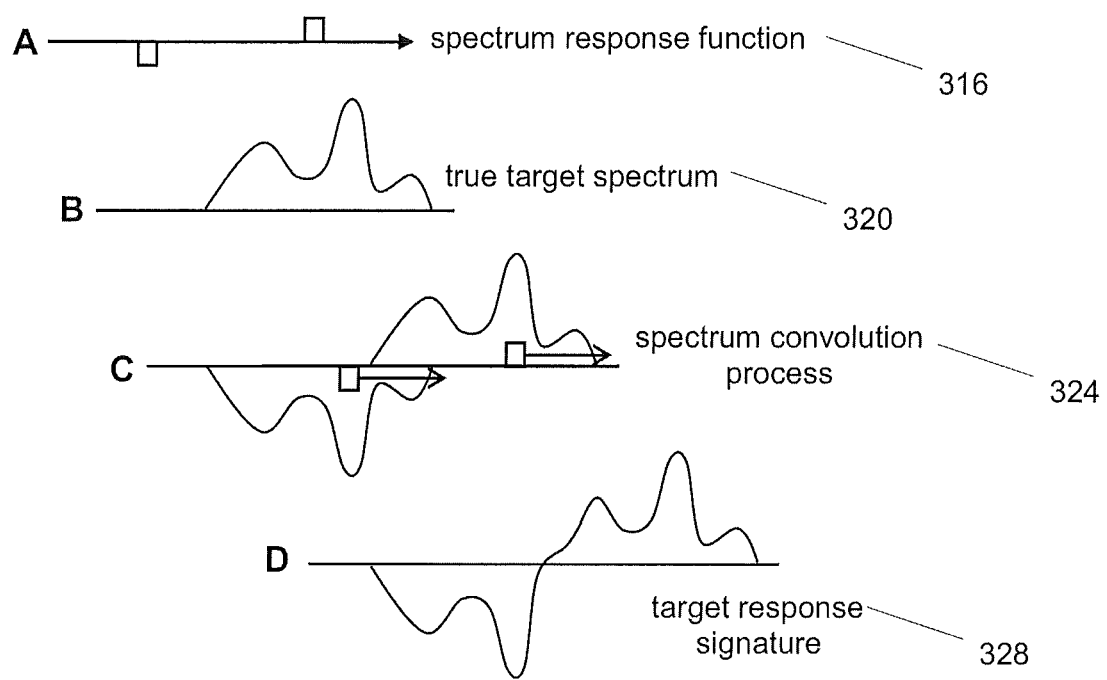
FIG. 3E depicts an exemplary embodiment of a method for generating a target response signature, according to an exemplary embodiment.

FIG. 3E depicts an exemplary embodiment of a method for generating a target response signature, according to an exemplary embodiment. Exemplary spectrum response function 316 (spectrum A) is generated by subtracting the output of one detector row subtracted from its succeeding row. The target of interest has a particular spectrum 320 (spectrum B). The spectrum response function 316 is convolved with the target spectrum 320 as shown in spectrum convolving step 324 to produce a target response signature 328 (spectrum D). This signature may be unique to the target and may assist the user in discriminating the target from some other object which has a different convolved target spectrum (different target spectrum B). The resulting target response 328 is a sequence of numbers which may be considered a vector. The vector can have negative components as well as positive components. The existence of negative components distinguishes this type of spectrum response from a conventional spectrum. This vector can be matched against a set of vector templates to determine the type of target and to discriminate it from a different type of target.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for multispectral imaging, the method comprising:
    positioning a continuously graded color filter in front of a plurality of detectors,
        wherein wavelengths of energy passed by the filter vary smoothly along the filter length, and
        wherein the detectors are configured in a pattern having a plurality of rows each having a plurality of detectors, and
        wherein each of the plurality of rows is oriented across the length of the filter;
    measuring outputs of the detectors in response to moving an image along the length of the filter; and
    generating a spectrum response function for the image based on the outputs of two or more rows of the detectors using a time delayed integration method.

2. The method of claim 1, wherein the step of generating a spectrum response function includes summing the outputs of two or more rows of the detectors.

3. The method of claim 1, wherein the step of generating a spectrum response function includes subtracting the outputs of two or more rows of the detectors.

4. The method of claim 1, comprising selecting specific rows to sum or subtract to control wavelength filtering properties.

5. The method of claim 1, wherein the rows selected for generating the spectrum response function are not adjacent rows.

6. The method of claim 1, wherein the step of generating a spectrum response function includes subtracting the outputs of two or more rows of the detectors to produce a spectrum response function that has two peaks in the spectrum.

7. The method of claim 1, comprising moving the image relative to the detectors at a constant velocity along the length of the filter.

8. The method of claim 1, comprising generating multiple spectrum response functions based on the outputs of different combinations of rows.

9. The method of claim 1, comprising converting the detector outputs to digital data prior to generating the spectrum response function.

10. The method of claim 1, comprising convolving the spectrum response function with a target spectrum to produce a target signature for a target in the image.

11. A multispectral imaging apparatus, the apparatus comprising:
    a continuously graded color filter configured so wavelengths of energy passed by the filter vary smoothly along the filter length;
    a plurality of detectors located on a first side of the filter and configured in a pattern having a plurality of rows each having a plurality of detectors to output signals generated in response to an image moving across the length of the filter,
        wherein each of the plurality of rows is oriented along the length of the filter, and
        wherein the detectors measure energy passing through the filter and; and
    a spectrum response module coupled to the plurality of detectors and configured to generate a spectrum response function for the image based on digital data associated with the outputs of two or more rows of the detectors using a time delayed integration method.

12. The apparatus of claim 11, wherein the spectrum response module is configured to generate the spectrum response function by summing the outputs of two or more rows of the detectors.

13. The apparatus of claim 11, wherein the spectrum response module is configured to generate the spectrum response function by subtracting the outputs of two or more rows of the detectors.

14. The apparatus of claim 11, wherein the spectrum response module is configured to sum or subtract specific rows to control wavelength filtering properties of the apparatus.

15. The apparatus of claim 11, wherein the rows selected for summing or subtracting are not adjacent rows.

16. The apparatus of claim 11, wherein the spectrum response module is configured to subtract the outputs of two or more rows of the detectors to generate a spectrum response function that has two peaks in the spectrum.

17. The apparatus of claim 11, comprising an actuator stage coupled to the filter and detectors to move the image relative to the detectors.

18. The apparatus of claim 11, wherein the spectrum response module is configured to generate multiple spectrum response functions based on the outputs of different combinations of rows.

19. The apparatus of claim 11, comprising an analog-to-digital converter module configured to convert the detector outputs to digital data and to provide the digital data to the spectrum response module to generate the spectrum response function.

20. The apparatus of claim 11, comprising a convolution module configured to convolve the spectrum response function with a target spectrum to produce a target signature for a target in the image.

* * * * *